March 17, 1964  S. REDNER  3,125,615

METHODS FOR THE MANUFACTURE OF PHOTOELASTIC DEVICES

Original Filed March 16, 1959

INVENTOR.
SALOMON REDNER

BY

*ATTORNEY*

United States Patent Office 3,125,615
Patented Mar. 17, 1964

3,125,615
METHODS FOR THE MANUFACTURE OF PHOTOELASTIC DEVICES
Salomon Redner, Norristown, Pa. (% The Budd Co., Hunting Park Ave., Philadelphia, Pa.)
Original application Mar. 16, 1959, Ser. No. 799,798. Divided and this application Aug. 29, 1962, Ser. No. 220,137
3 Claims. (Cl. 264—1)

This invention pertains to methods for the manufacture of birefringent photoelastic devices adapted to exhibit areal birefringence patterns and, when strained, to exhibit composite birefringence and forced-birefringence patterns related to the imposed strains. This application is a division of the copending application S.N. 799,798, filed March 16, 1959, and assigned to the instant assignee.

Birefringence, double, refraction, is an inherent property of transparent materials, such as quartz, calcite, and herapathite crystals, resulting in resolution of incident light rays into two plane polarized component rays and the transmission thereof according to differing indices of refraction. For one of the component rays, the ordinary or O-ray, the index of refraction is a constant, $n_O$, and propagation is according to Snell's law of refraction; for the other component ray, the extraordinary or E-ray, the the propagation within the birefringent material and the applicable index of refraction, $n_E$, vary according to the direction of the incident light. The planes of polarization of the E and O component rays are mutually perpendicular, and, for a given angle of incidence, the refractive index difference, $\Delta_n = |n_O - n_E|$, is a constant.

Forced-birefringence is a property of transparent materials generally whereby under the action of loading forces a degree of birefringence is exhibited at an included region proportional to the difference in the principal stresses acting at that region. The corresponding refractive index difference, $\Delta_n$, is given by the stress-optic law as:

$$\Delta_n = |n_O - n_E| = k|s_1 - s_2| \qquad (I)$$

where $k$ is a proportionality constant, and $s_1$ and $s_2$ are magnitude of the maximum and minimum stresses normal to the direction of propagation through the pertinent region. Here, the planes of polarization of the E and O rays are parallel respectively, with the mutually perpendicular stress directions $\bar{s}_1$ and $\bar{s}_2$ within the pertinent region.

The E and O component rays travel through a birefringent region at velocities inversely proportional to their respective indices of refraction. Therefore, for any physical path length through the region a phase difference, or relative retardation, is produced between the vibrations of the E and O rays. The magnitude of the phase difference $d$, is directly proportional to the refractive index difference $\Delta_n$ and to the physical path length D according to:

$$d = \Delta n D \qquad (II)$$

When the component E and O rays are transmitted through an analyzer (a plane polarizer comprising a Nicol prism or a dichroic sheet of oriented herapathite crystals) interposed between the birefringent region and a viewing position, the emergent component vibrations are in the plane of polarization of the analyzer. Interference fringe patterns are caused by reinforcement and destructive interference between the coplanar E and O components and will appear superimposed up on the physical features of the pertinent region as viewed through the analyzer.

An important application of forced-birefringence has been to investigations of two dimensional surface strains in workpieces. Conventionally, a thin sheet of forced-birefringent material, such as Bakelite or Celluloid, is attached to a testpiece to a workpiece surface by bonding. Thereafter, as the workpiece is variably deformed under applied loads, the bonding causes strain patterns in the testpiece identical to those of the workpiece surface. The relationship between the relative retardation $d$, and strains normal to the direction of propagation of light through the testpiece, may be stated, upon substitution of the equivalent maximum-minimum strain difference for the maximum-minimum stress difference of Equation I as:

$$\Delta n = k|e_1 - e_2|E/(1+m) \qquad (III)$$

where $e_1$ and $e_2$ are the maximum and minimum normal strains, and E and $m$, respectively, are Young's modulus and Poisson's ratio for the testpiece material.

The fringes which are seen upon analysis of the light transmitted through a birefringent region comprise colored, isochromatic, interference fringes. Such fringes appear superimposed on the testpiece surface and are the loci of points where the principal strain difference produces, according to Equation III above, a phase difference of:

$$d = (NL + AL) \qquad (IV)$$

where N, the fringe order, is an integer or zero, L is the wave length of a color of the incident light, and A is a constant equal to ½ or to 0 depending upon the relative orientation of the plane of polarization of the analyzer as either parallel with or perpendicular to the plane of polarization of the incident light. At various points within the region investigated, the relative retardation produced by the principal strain difference results in extinction by interference and subtraction of those wave lengths of the incident light for which Equation IV is satisfied. With monochromatic incident light interference patterns comprise alternate bright and dark areas; with polychromatic light the observed fringe colors are a complementary function of the extinguished wave length. Therefore, the principal strain difference at a point is known when a fringe order and color associated with that point are known.

In polychromatic fringe patterns, certain color differentials are more readily defined than others and are referred to as boundary fringes. These fringes are the color change that occurs in the region at the end of one spectrum color series, or order, and at the start of the next. The boundary fringes are observed as a narrow band between the violets of a preceding order and the reds of the next succeeding order. With reference to Equation IV above, and assuming a crossed-analyzer orientation so that $A=0$, the first boundary fringe is produced at positions in a fringe pattern where the relative retardation between the E and O rays is equivalent to a known phase difference, $d_1=L_1$; at the positions of the second boundary fringe the phase difference $d_2=2L_1$, etc. The relative retardation and hence the principal strain difference can be assigned a precise value at locations of a boundary fringe. By extrapolation, principal strain difference values can then be assigned to the fringe colors comprising each order between boundary fringes.

It is often convenient that a given fringe, a boundary fringe for example, be superimposed upon a pertinent testpiece region during a strain investigation. Generally this will require translation of a fringe pattern relative to the region. The translation is accomplished by means of an interposed compensator which adds a sufficient known phase difference to that produced within the testpiece so that the cumulative retardation produces the desired fringe position.

A relatively simple compensator design is that of the Babinet type comprising complementary wedges of a birefringent material, usually quartz. One wedge is cut with its optic axis perpendicular to its refracting edge and the other wedge is cut with its optic axis parallel with its refracting edge. When the wedges are arranged to provide a parallelepiped, the retardation produced at a region of the compensator is a linear function of the displacement of that region from the refracting edges of the wedges. These and other conventional compensators, however, are most expensive in their simplest forms because the dimensional and orientational tolerances in their fabrication are of the order of fractions of wave lengths of visible light.

While the conventional methods and devices are extremely useful in strain investigations, the information obtained relates generally to strain differences rather than to strain magnitudes. Techniques presently available for translating such strain difference information into strain magnitudes include simultaneous fringe pattern production by multiple-incidence systems and applications of optical-electrical transducer instrumentations. There has been however, no independent, precise and inexpensive, strain gauge means for the direct presentation of photoelastic effects related to strain magnitudes.

Therefore, it is an object of this invention to provide photoelastic devices comprising a unitary, dual purpose, combination birefringent compensator and forced-birefringent testpiece.

It is a further object of this invention to provide photoelastic devices comprising a unitary combination birefringent compensator and forced-birefringent testpiece adapted as an independent, direct-reading, strain gauge.

Another object of this invention is to provide an economical process for the production of precise photoelastic devices exhibiting a permanent and predetermined pattern of birefringence.

The manufacturing processes provided by this invention, comprise the steps of shaping a blank of forced-birefringent material according to a predetermined relationship between the shape of the blank and internal stress patterns produced therein by a given set of loading forces; heating the blank above ambient temperature; subjecting the blank at the elevated temperature to the given set of loading forces; and cooling the blank to ambient temperature while application of the given set of loading forces is maintained.

A better understanding of this invention, however, will be had upon consideration of the following detailed explanation and the accompanying drawing wherein.

Figure 1:
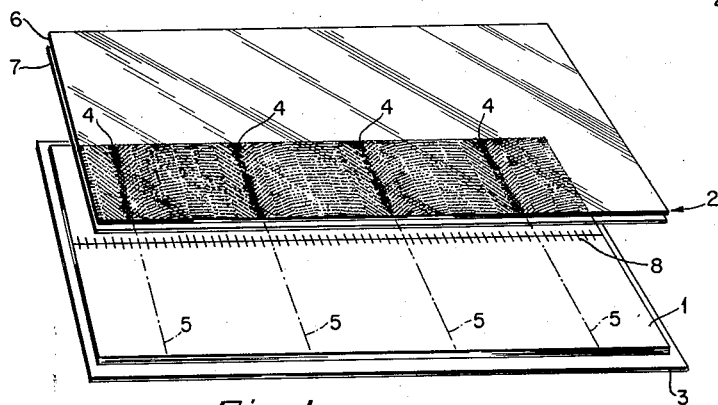
FIG. 1 illustrates a preferred embodiment of the combination birefringent compensator and forced-birefringent testpiece of this invention in conjunction with auxiliary apparatus.

With particular reference to FIG. 1, the combination birefringent compensator and forced-birefringent testpiece of this invention is shown as a stratum 1 of birefringent material oriented between a polarizer 2 and a reflector 3. An isochromatic fringe pattern is represented by shading between the positions 4 of isochromatic boundary fringes. Such visible patterns appear when ordinary light is polarized by polarizer 2, passed through the birefringent stratum 1, and reflected by mirror 3 back through the stratum 1 and polarizer 2 to an observer.

The observable fringe orientation is due to an equivalent refractive index difference pattern within the stratum 1. Since such a pattern would not be visible with ordinary light, regular increments of increasing refractive index difference $\Delta n$ are indicated by the dashed lines 5 where the view of the birefringent stratum 1 is not through the polarizer 2.

The polarizer 2 is illustrated as a composite of a sheet of polarizing dichroic material 6 which transmits, substantially, only light polarized in a single plane and a quarter-wave plate 7, a sheet of birefringent material of a thickness which causes a 45° rotation of the plane of polarization of light transmitted therethrough. Since the light reflected by mirror 3 again traverses the quarter-wave plate 7 before its further transmission by dichroic sheet 6, a second 45° rotation of the polarization is produced by the quarter-wave plate 7. Therefore, this conventional quarter-wave plate application allows the single polarizer 2 to serve simultaneously as a plane polarizer for the incident light and as a crossed-analyzer for the reflected light.

When the thickness of the stratum 1 is constant, as shown, the relative retardation between the O and E ray component vibrations according to Equation II above is given by:

$$d = \Delta n(2t) \qquad (V)$$

where $t$ is the stratum thickness and $2t$ is substituted for the physical path length of D, the incident light passing through the stratum 1 twice before reaching the observer.

The relative retardation at the fringe positions is given by:

$$d = NL \qquad (VI)$$

from Equation IV by substitution of $A=0$ for this case of perpendicular planes of polarization of the incident light (i.e. that passed by polarizer 2 from a light source not shown) and of the analyzer (i.e. polarizer 2 as interposed between stratum 1 and observer).

As indicated in FIGURE 1, the fringe colors, between boundary fringes 4, are recurrent in a regular sequence and each order is associated with a different integral value of N in Equation VI. The associated refractive index difference $\Delta n$ at any region within the area of the stratum 1 is a function of the coordinates of that region with respect to an origin within the stratum. In the specific embodiment of FIGURE 1, the refractive index difference is independent of lateral displacement of a region and is equal to the product of a constant times the displacement of the region from one of the longitudinal ends of the stratum 1. This refractive index pattern exists as a permanent or a biasing pattern within the stratum 1 and the fringe positions indicated are those observed when no external loading is present. External loading forces, as explained in more detail hereinbelow would superimpose upon the biasing pattern at each position, geometrically, an additional refractive index differential value, according to Equation III above, proportional to the externally created principal strain difference at each region. The net refractive index difference at any point and the net relative retardation would be then changed and the observed fringe pattern shifted concomitantly. Therefore, variations in the original fringe pattern associated with the unloaded stratum 1 are directly related to strains imposed upon the stratum.

The permanent fringe pattern may be calibrated according to the principal strain difference increment equivalent to the change in refractive index difference between boundary fringe 4. Further, since the permanent fringe pattern is a linear function of longitudinal displacement along the stratum 1, a scale 8 may be applied to the stratum surface and graduated directly in terms of applied strains. For example, the parameters of the permanent fringe pattern may be chosen so that the change in refractive index difference between boundary fringes 4 is equivalent, by the relationship of Equation III, to a change in principal strain difference of $1000 \times 10^{-6}$ inches per inch. The scale 8 may then be graduated linearly between boundary fringe positions 5 with scale divisions representing a convenient fraction of strain gradient.

Thereafter, the principal strain difference caused by external loading of the stratum 1 can be read directly as a shift of a boundary fringe 4 along the scale 8.

The stratum 1, is therefore, a unique dual function photoelastic device in that it is both a birefringent compensator providing a known phase difference between E and O component ray vibrations of transmitted light and, simultaneously, a forced-birefringent testpiece providing a cumulative phase difference related to externally produced deformations. An even more unique advantage of the unitary stratum 1 is its presentation of strain information as a visually perceivable scaled alteration of a predetermined pattern of birefringence.

Figure 2:
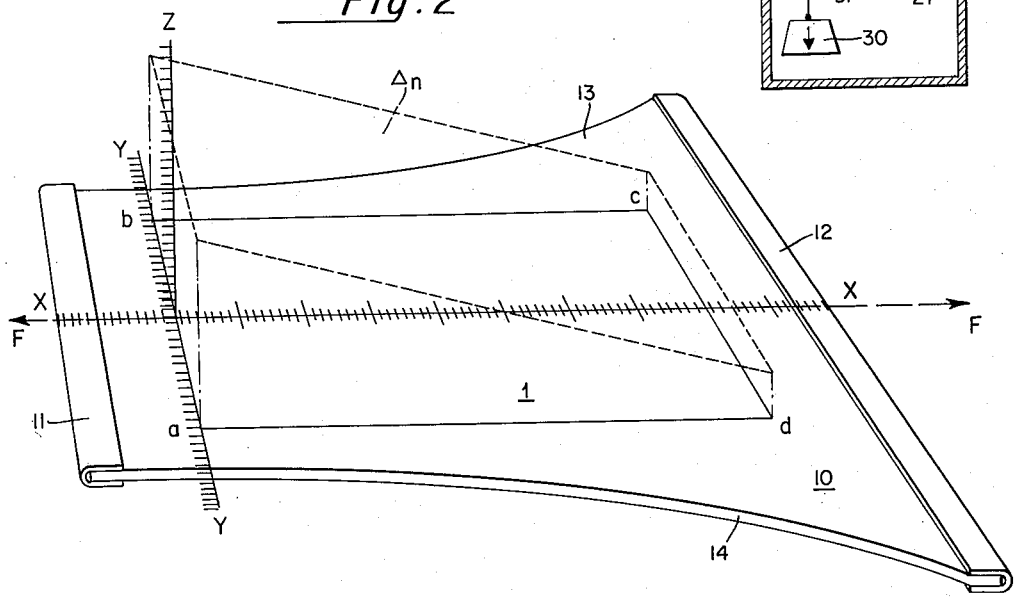
FIG. 2 is a schematic view of a blank from which the device of FIG. 1 is fabricated.

FIGURE 2 illustrates a blank 10 of forced-birefringent material from which the combination birefringent compensator and forced-birefringent testpiece stratum 1 of FIG. 1 is formed according to an example of manufacturing methods of this invention. By way of explanation, a set of coordinate axes, $xx$, $yy$, and $zz$, is shown superimposed upon the blank 10. The stratum 1 eventually cut from the blank 10 is indicated by the area $abcd$. When loading forces are applied to the blank 10 a strain pattern will arise therein in a form dependent upon the forces and upon the shape of the blank 10. A linear refractive index difference gradient, represented by the plane $\Delta n$, is readily achieved when tensile forces represented by the vectors F are applied to a properly shaped blank by means of loading bars 11 and 12. The illustrated blank 10 is sufficiently thin, of constant thickness $t$, to be insignificantly strained in the $zz$ direction and the lateral edges 13 and 14 are unrestrained. Under these conditions the maximum principal stress will be in the $xx$ direction and no significant stress will be produced in either the $yy$ or $zz$ directions. Therefore, the magnitudes of the principal strains at any region within the stratum 1 will be a function of the applied tension and of the cross-sectional area of the blank normal to the direction.

The significant principal unit stress acting upon a plane normal to the $xx$ direction and at a distance $x$ from the origin will be:

$$s = P/2yt \tag{VII}$$

where P is a magnitude of the tensile load, $t$ the thickness of the blank and $y$ the half-width of the blank at that plane. The simultaneous condition that the stress on any section be a linear function of longitudinal displacement of that section is given by:

$$s = s_m - kx \tag{VIII}$$

where $s_m$ is the stress maximum at the plane of the origin and $k$ is a constant representing a desired stress gradient. A known boundary condition is that:

$$s_m = P/2y_0 t \tag{IX}$$

where $y_0$ is the half-width of the blank at the origin. It follows directly from the relationships VII, VIII and XI that a linear stress gradient will be produced by above the tensile load P when each side of the blank is shaped to follow a curve expressed by:

$$y = (P/2t)/(P/2ty_0 - kx) \tag{X}$$

By a proper choice of the stress gradient $k$ any desired gradient for the refractive index differential $\Delta n$ as a function of $x$ may be imposed upon the material of the blank according to the illustrated method.

Specific values for the several factors of Equation X may be determined from known stress-strain and strain-optical properties of forced-birefringent materials. However, it is relatively simple to choose the blank shape and the loading force magnitudes empirically by experiment.

It will be realized that refractive index patterns produced according to the above are ordinarily not permanent and disappear when the loading forces are released. According to this invention, however, while the blank is strained during the application of the external load, the blank is heated to a temperature above the photoelastic critical temperature of the material, equilibrium deformation of the blank is allowed to occur according to its elastic properties at the elevated temperature, and, subsequently, the blank is cooled below the photoelastic critical temperature before removal of the loading forces. By this process step, an optically effective deformation of the blank is permanently retained.

The residual refractive index difference patterns may be explained according to a diphase theory of the molecular structure of transparent forced-birefringent materials. Such materials owe at least a part of their structural characterteristics to two sets of molecular bonds; secondary bonds causing adherence among constituent molecules due primarily to van der Waals' forces and primary, chemical, bonds creating interconnected micellular agglomerations of macro-molecules to provide a random framework throughout the material. The secondary bonds are relatively weak and the phase maintained by them is a fusible phase. Fusion will occur for this phase at a moderate temperature, a so-called photoelastic critical temperature, below the decomposition temperature of the material. The micell network created by the primary bonds, however, is an infusible phase.

Therefore, an understanding of the permanent forced-birefringence pattern formed according to this invention follows when it is assumed that at temperatures above the photoelastic critical temperature, the blank 10 is a composite of fused material encompassing a structural framework of unfused material. External loading forces applied to this dual state composite selectively induce elastic strains and restoring stresses in the infusible phase. When the temperature is reduced below the photoelastic critical temperature, the fusible phase congeals and thereafter opposes relief of the stresses induced in the infusible phase. Upon subsequent removal of the loading forces an equilibrium condition will be established in which residual stresses persist in both phases of the material. Because of the random distribution of the phases, the residual stress gradient and hence the residual refractive index difference pattern, will be geometrically similar to the original gradients induced by the loading forces. After the prescribed annealing steps have been completed, one or more pieces such as the stratum 1, of any desired shape, may be cut from the blank, calibrated, and applied in accordance with this invention.

While transparent, forced-birefringent materials in general will re-act according to the explanation given above, preferred materials for the combination birefringent compensator and forced-birefringent testpiece of this invention include transparent forced-birefringent thermosetting polymerized plastic materials of which Bakelite, a glycerin phthallic anhydride, is an excellent example. Other advantageous materials include resins of the styrene-alkyd type in which alkyds are copolymerized with styrene.

The photoelastic critical temperature for an applicable material may be readily determined empirically upon collection of stress-strain data at a series of temperature conditions. For lower non-fusion temperatures the stress-strain relationship is linear. At intermediate temperatures approaching the photoelastic critical temperature the stress-strain relationship becomes non-linear due to partial fusion of the secondary-bond phase of the material. Above the photoelastic critical temperature the stress-strain relationship becomes linear again for a substantial temperature range wherein the material acts as the diphase composite. Therefore, as used in this specification, the term diphase fusion temperature is taken to mean a temperature at which a forced-birefringent material exhibits the characteristic, substantially linear, stress-strain relationship of a diphase composite. For example, the diphase fusion temperature range of Bakelite is between the approximate limits of 230 and 260° F.

At the photoelastic critical temperature, the secondary bonds of the fusible state of the birefringent material will have broken down and then restoring stresses will be carried by the elastic solid network of the primary bonds within the infusible state of the material. Therefore, under this condition the stress strain relationship for the material will be linear and determination of the temperature at which such a relationship occurs is a further indication of the photoelastic critical temperature.

For purposes of this explanation, therefore, the pertinent annealing temperature range may be defined as including those temperatures at which the material of the blank acts as a diphase and exhibits a substantially linear stress-strain relationship.

Figure 3:
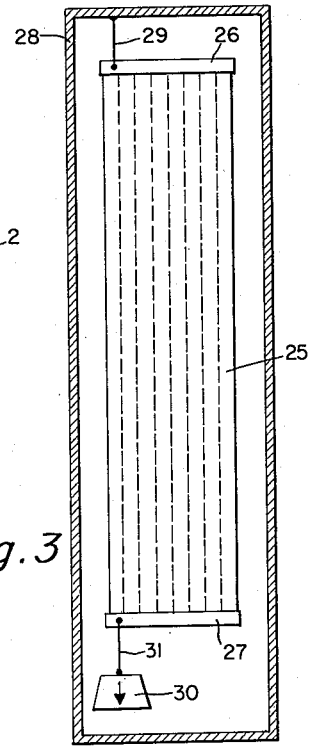
FIG. 3 illustrates an apparatus and method for production of permanent refractive index difference patterns in forced-birefringent materials.

FIGURE 3 illustrates an economical apparatus for producing the combination birefringent compensator and forced-birefringent testpiece. The blank 25 is shown as a rectangular sheet of forced-birefringent material. Loading bars 26 and 27 are attached to the upper and lower ends of the blank 25 for the application of loading forces. An elongated vertical enclosure 28 is provided for annealing of the blank by means of a controlled temperature immersion bath.

A linear gradient $\Delta n$ pattern may be formed within the blank by hanging the upper loading bar 26 from a support 29 attached near one end of the blank and to the enclosure 28. A known load may be applied by hanging a weight 30 from a support 31 attached similarly to loading bar 27. The resulting stress at any given region of the blank will then be independent of longitudinal position, neglecting the weight of the blank and loading bars, and a linear function of lateral displacement of the region from the line of application of the weight 30.

While the constant load is maintained on the blank 25 by the weight 30, hot gasses or fluids may be flowed through the enclosure 28 to raise the temperature of the blank 25 to the diphase fusion temperature of a specific forced-birefringent material employed. Close temperature control of the annealing process and isolation of the blank from mechanical shocks may be readily accomplished by this apparatus. The blank 25 may finally be sectioned as desired to form a number of similar compensator-testpieces.

According to the examples of FIG. 2 and of FIG. 3, the final stratum has been of the same thickness as that of the annealed blank.

While each of the above illustrated embodiments of this invention has been described in terms of linear compensator patterns of birefringence, there will be many modifications apparent to one skilled in the art of photoelasticity whereby non-linear compensator patterns are formed and applied. By a proper choice of the shape of the blank and of the loading forces applied during annealing, any desired pattern for the refractive index differential $\Delta n$ as a function of position may be produced within a compensator-testpiece.

Figure 4:
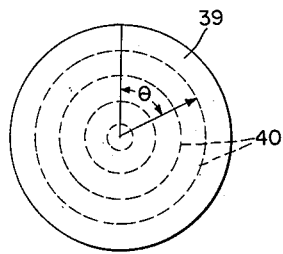
FIG. 4 illustrates an alternative embodiment of this invention incorporating a non-linear refractive index difference pattern.

FIGURE 4, by way of example, illustrates a combination birefringent compensator and forced-birefringent testpiece stratum 39 in which the value of $\Delta n$ varies directly with the radial displacement of a region from a central origin. This annular pattern may be achieved by rotation of a cylindrical blank about its axis during the annealing steps explained hereinbefore. The radial stress gradient produced by centripetal forces during rotation at a constant speed will create concentric annular positions of equal forced-birefringence. As viewed through a polarizing-analyzing optical system, the compensator fringe patterns will comprise boundary fringes at concentric locations, represented in the figure by dashed lines 40.

The pattern indicated by FIGURE 4 will also be produced when a thin circular blank of birefringent material is clamped at its edge and loaded by a constant air or hydrostatic pressure applied against one surface of the sheet during annealing. Conversely, a compensator pattern of this annular type is directly applicable as a pressure gauge since the annular fringes will shift radially and concentrically under the application of a differential pressure.

In the foregoing disclosure it has been shown that this invention provides improved photoelastic devices comprising a combination birefringent compensator and forced-birefringent testpiece stratum and at the same time an economical and precise method of fabricating the same. It should be understood however, that the invention is not limited to the precise arrangements herein described in connection with the illustrative drawing, but that other arrangements within the scope of the appended claims are to be considered within the purview of the invention.

What is claimed is:

1. A method for the fabrication of a unitary, homogeneous, combination birefringent compensator and forced-birefringent testpiece means, which method comprises the steps of producing a blank by conforming the lateral edges of a uniform thickness sheet of a polymerized plastic forced-birefringent material according to a predetermined relationship between the shape of the blank and internal stress patterns produced therein by a given set of tensile loading forces, heating the blank to a diphase fusion temperature for the material of the blank, subjecting the blank at the diphase fusion temperature to the given set of loading forces, cooling the blank below the diphase fusion temperature while applications of the given set of loading forces is maintained, and then separating a section from the blank to provide an individual compensator-testpiece means having the same upper and lower surfaces as the blank.

2. The method of claim 1 wherein the blank is shaped to define a uniform thickness rectangle and said set of loading forces comprises opposing tensile forces applied along one edge of the rectangle.

3. A method for the fabrication of a unitary, homogeneous, combination birefringent compensator and forced-birefringent testpiece means, which method comprises the steps of hanging a rectangular uniform thickness sheet of a polymerized plastic forced-birefringent material between a support at a first corner and a predetermined weight at a second corner on the same edge as the first corner to subject the sheet to loading forces according to a predetermined relationship between the shape of the sheet and internal stress patterns produced therein by the loading forces, heating the sheet to a diphase fusion temperature for the material of the sheet and cooling the sheet below the diphase fusion temperature while maintaining application of the loading forces, and then separating a section from the sheet to provide an individual testpiece-compensator means having the same upper and lower surfaces as the sheet.

No references cited.